Patented Feb. 17, 1942

2,273,158

UNITED STATES PATENT OFFICE 2,273,158

POLYMERIZATION PROCESS

Robert M. Thomas, Union, and Donald C. Field, Roselle Park, N. J., assignors to Standard Oil Development Company, a corporation of Delaware No Drawing. Application April 21, 1939, Serial No. 269,178

10 Claims. (Cl. 260—93)

This invention relates to polymerization processes, and particularly to a new and useful form of process for the interpolymerization of isoolefinic diolefinic substances.

It has been found possible to polymerize mixtures of isoolefinic substances and diolefinic substances such as isobutylene with butadiene, or isobutylene with isoprene, or chloroprene, or cyclopentadiene, or of ethyl methyl ethylene with butadiene or with isoprene, or with chloroprene, etc., by the addition to the mixture of a suitable Friedel-Crafts type of catalyst to produce a solid polymer having for a given amount of unsaturation a much higher molecular weight than can be obtained from isobutylene alone. The mixed polymer also is reactive with sulfur, as polyisobutylene alone is not, and when so reacted with sulfur produces a cured polymer having a very high molecular weight, a high tensile strength and a high elasticity. Difficulty is, however, experienced in obtaining the maximum molecular weight, and in obtaining uniformity of molecular weight throughout the mass of mixed polymer from a given batch.

The present invention provides a new and useful method of conducting the polymerization of mixtures of isoolefinic and diolefinic substances, particularly isobutylene and butadiene, for the production of the desired character of polymer. The invention depends particularly upon the discovery that there is an induction period or time delay between the addition of the catalyst and the beginning of the polymerization in mixtures of the catalyst and the diolefin, whereas there is no such delay, or the delay is exceedingly short, with the mixtures of catalyst and the isoolefin. Broadly, therefore, the process consists in the mixing of the polymerization catalyst with the diolefinic substance, and immediately thereafter the mixing of the isoolefinic substance with the mixed catalyst and diolefinic material. Under such conditions, an excellent dispersion of catalyst in the reaction mixture is readily obtained, and the polymerization reaction proceeds smoothly and rapidly to the production of a polymeric material of higher molecular weight, higher tensile strength, higher elasticity, and higher flexure and abrasion resistance than is obtainable by the other processes.

Accordingly, an object of the invention is to polymerize a mixture of isoolefinic and diolefinic substances and to conduct the polymerization by first mixing the catalyst with the diolefinic substance and making use of the induction period or time delay to permit the addition thereto and mixing therewith of the isoolefinic substance, before the polymerization begins, and thereafter to obtain an interpolymerization of the isoolefinic and diolefinic substances. Other objects and details of the invention will be apparent from the following description.

In the processing of crude petroleum for the production of maximum amounts of gasoline boiling range hydrocarbons, it is customary to top the crude to remove the natural gasoline boiling range hydrocarbons, and thereafter crack the heavier portions of the crude by a heat treatment. The cracking operation produces approximately 15% of the charged, topped crude of gaseous material which consists of a mixture of hydrogen, methane and its gaseous homologues, ethylene and its gaseous homologues, etc., including substantial proportions of isobutylene and butadiene. These latter two gases are purified and serve as raw materials for the polymerization procedure.

The isobutylene and butadiene after purification are compressed and cooled to cause them to condense, and they are then further cooled to a temperature ranging from $-50°$ C. to $-150°$ C. Simultaneously a polymerization catalyst is prepared by dissolving a Friedel-Crafts type catalyst such as aluminum chloride, boron trifluoride, stannic chloride, titanium tetrachloride, zirconium chloride, and similar metals taken from groups 2 and 3 of periodic table in a halogenated hydrocarbon solvent such as ethyl or methyl chloride or fluoride. The dissolution of the catalyst in the hydrocarbon halide is preferably conducted at or near room temperature, and the catalyst solution is thereafter diluted if desired to a suitable concentration, and then chilled to a low temperature.

In the practice of the present invention, the chilled catalyst solution is thoroughly mixed with the chilled liquid butadiene, either in the pure form, or preferably when diluted with a diluent-refrigerant such as liquid ethylene or liquid propane or similar low boiling liquids or mixtures of liquids. The mixing of the catalyst and butadiene either pure or diluted with the diluent-refrigerant, is desirably conducted quite rapidly; preferably at such speed that the mixing is complete within 10 to 30 seconds. Thereafter the quantity of chilled isobutylene is also quickly added, and stirred into the mixture as quickly as possible. The addition of the isobutylene is desirably conducted in the shortest possible time, and the completion of the mixing also is desirably conducted in the shortest possible time. Periods of time from 5 to 15 seconds for the addition and mixing are exceedingly desirable, and a period of time not longer than 45 seconds for either of the mixing operations is particularly advantageous since the shorter the time required for the mixing operation the higher the quantity of the resulting polymer. The induction period or latent time for the polymerization of the butadiene alone appears to be a matter of 2 to 4 or 5 minutes, varying somewhat with the lowness of the temperature, the concentration of the catalyst, and the proportion of diluent-refrigerant. The time for polymerization of the mixture of isobutylene-butadiene and catalyst appears to be substantially shorter and it is usually desirable that the complete addition and mixing of the chilled isobutylene be completed within 2 or 3 minutes although satisfactory results are obtainable with longer periods of time. The polymerization reaction as such appears to be complete in about 5 minutes from the completion of the mixing in of the isobutylene, and the polymerization time rarely exceeds 10 minutes.

It may be noted that if the catalyst is added to the chilled isobutylene first, the polymerization reaction is well under way within a matter of a very few seconds, and it is not possible to add the chilled butadiene and mix it into the isobutylene catalyst mixture quickly enough to obtain a polymer containing any substantial amount of butadiene. Furthermore, it is found that to obtain a maximum molecular weight of the polymer substance it is desirable that the concentration of dissolved catalyst in the solution be very low, usually a small fraction of 1%. When the polymerization procedure is conducted by mixing the chilled butadiene and chilled isobutylene, and then adding the chilled catalyst solution, the concentration of the catalyst at the point of addition is so high as to precipitate a false polymerization procedure which results in the production of considerable quantities of relatively very low molecular weight polymers which are exceedingly undesirable.

But the particular procedure as above disclosed is dependent upon, and possible only because of, the previously unknown and undiscovered induction period or latent period of time delay in the incidence of the polymerization reaction with butadiene alone.

In the preparation of the reacting substances, it is desirable that the isoolefin be in the preponderant proportions, and a desirable range of proportions is from 70 to 90 parts of the isoolefin such as isobutylene, and from 30 to 10 parts of the diolefin such as butadiene. These proportions when treated with a catalyst solution of aluminum chloride in ethyl or methyl chloride produce a solid polymer having an iodine number of the order of 5 to 12 (in contrast to isobutylene which has an iodine number of approximately 450, in contrast to butadiene which has an iodine number of approximately 900, and in contrast to rubber which has an iodine number of approximately 350). The polymeric substance has some of the physical characteristics of crude rubber, but its chemical characteristics are outstandingly different especially in view of the low iodine number, which indicates that the material is a substantially saturated compound. Tests indicate the absence of cyclization, and therefore the polymeric substance appears to be a substantially saturated, linear chain hydrocarbon, in view of the absence of oxygen or other substitution elements. The molecular weight of the polymer, as determined by the Staudinger method, ranges from 50,000 upward to 250,000, and in some instances to higher limits. The top limit of molecular weight has not as yet been determined. The polymer substance is conveniently purified from the diluent-refrigerant, and from unreacted traces of the olefinic gases by warming up to or about room temperature and allowing the undesired substances to volatilize. The catalyst is conveniently removed by any of a wide range of washing treatments, particularly in a kneading machine of the Werner and Pfleiderer type. The polymer, in spite of its low degree of unsaturation, is reactive with elemental sulfur, and with various of the sulfur-containing mercapto compounds, and when so treated it shows a tensile strength ranging from 3,000 to 3,500 pounds per square inch, an elongation ranging from 700 to 1,300, and flexure and abrasion resistances superior to rubber.

In the disclosure of the preferred procedure for practicing the invention it is recommended that the catalyst solution mixed with the butadiene is prepared, and then the isobutylene added to the butadiene-catalyst mixture. This, however, is not necessary, since equally good results are obtained by chilling the isobutylene, and thereafter adding thereto the chilled mixed butadiene and catalyst. Either procedure is equally satisfactory.

The above disclosures are presented as utilizing isobutylene and butadiene as the reacting raw materials, together with a catalyst consisting of aluminum chloride dissolved in an organic halide. Another embodiment of the invention conveniently utilizes a mixture of catalyst with isoprene which is mixed into, or mixed with, isobutylene as the isoolefin, or with ethyl methyl ethylene as the isoolefin. Alternatively, it is possible also to use chloroprene as the diolefin, or to use cyclopentadiene as the diolefin, with either isobutylene or ethyl methyl ethylene as desired.

The process of the invention thus provides a new and useful type of polymerization procedure which depends upon a newly discovered characteristic of the polymerization reaction, the use of which makes possible the production of high molecular weight polymers of much higher average molecular weight, much narrower range of molecular weight, and substantially free from low molecular weight polymers.

While there are above disclosed but a limited number of the embodiments of the invention, it is possible to produce still other embodiments without departing from the inventive concepts herein disclosed and it is therefore desired that only such limitations be imposed on the appended claims as are stated therein or required by the prior art.

The invention claimed is:

1. A polymerization procedure comprising in combination the steps of mixing a diolefin and a refrigerant at a temperature between −50° C. and −150° C., adding thereto a Friedel Crafts type catalyst and then within a time interval of 5 minutes, adding to the mixture of diolefin, refrigerant and catalyst, a portion of isoolefin, and conducting the polymerization of the mixed olefins to yield an interpolymer.

2. A polymerization procedure comprising in combination the steps of mixing a diolefin and a refrigerant at a temperature between −50° C. and −150° C., adding thereto a Friedel Crafts type catalyst and then within a time interval of 5 minutes, adding to the mixture of diolefin, refrigerant and catalyst, a portion of chilled isoolefin, and conducting the polymerization of the mixed olefins to yield an interpolymer characterized by a molecular weight above 50,000, by reactivity with sulfur and an iodine number substantially less than the iodine number of rubber.

3. A polymerization procedure comprising in combination the steps of mixing a diolefin comprising butadiene and a refrigerant at a temperature between —50° C. and —150° C., adding thereto a Friedel Crafts type catalyst and then within a time interval of 5 minutes, adding to the mixture of diolefin, refrigerant and catalyst, a portion of chilled isoolefin, comprising isobutylene, and conducting the polymerization of the mixed olefins to yield an interpolymer.

4. A polymerization procedure comprising in combination the steps of mixing a diolefin comprising isoprene and a refrigerant at a temperature between —50° C. and —150° C., adding thereto a Friedel Crafts type catalyst and then within a time interval of 5 minutes, adding to the mixture of diolefin, refrigerant and catalyst, a portion of chilled isoolefin, comprising isobutylene, and conducting the polymerization of the mixed olefins to yield an interpolymer.

5. A polymerization procedure comprising in combination the steps of mixing a diolefin comprising pentadiene and a refrigerant at a temperature between —50° C. and —150° C., adding thereto a Friedel Crafts type catalyst and then within a time interval of 5 minutes, adding to the mixture of diolefin, refrigerant and catalyst, a portion of chilled isoolefin, comprising isobutylene, and conducting the polymerization of the mixed olefins to yield an interpolymer.

6. A polymerization procedure comprising in combination the steps of mixing a diolefin comprising butadiene and a refrigerant at a temperature between —50° C. and —150° C., adding thereto a Friedel Crafts type catalyst comprising aluminum chloride and then within a time interval of 5 minutes, adding to the mixture of diolefin, refrigerant and catalyst, a portion of chilled isoolefin, comprising isobutylene, and conducting the polymerization of the mixed olefins to yield an interpolymer.

7. A polymerization procedure comprising in combination the steps of mixing a diolefin comprising butadiene and a refrigerant at a temperature between —50° C. and —150° C., adding thereto a Friedel Crafts type catalyst comprising aluminum chloride dissolved in an alkyl halide, and then within a time interval of 5 minutes, adding to the mixture of diolefin, refrigerant and catalyst, a portion of chilled isoolefin, comprising isobutylene, and conducting the polymerization of the mixed olefins to yield an interpolymer.

8. A polymerization procedure comprising in combination the steps of mixing a diolefin comprising butadiene and a refrigerant at a temperature between —50° C. and —150° C., adding thereto a Friedel Crafts type catalyst comprising aluminum chloride dissolved in ethyl chloride, and then within a time interval of 5 minutes, adding to the mixture of diolefin, refrigerant and catalyst, a portion of chilled isoolefin, comprising isobutylene, and conducting the polymerization of the mixed olefins to yield an interpolymer.

9. A polymerization procedure comprising in combination the steps of mixing a diolefin and a refrigerant at a temperature between —50° C. and —150° C., adding thereto a Friedel Crafts type catalyst and then within a time interval of 5 minutes, adding to the mixture of diolefin, refrigerant and catalyst, a portion of chilled isoolefin, and conducting the polymerization of the mixed olefins to yield an interpolymer, and removing the catalyst by application of hydrolytic material to the polymer.

10. A polymerization procedure comprising in combination the steps of mixing a diolefin comprising butadiene in the proportion of 10 to 30 parts and a refrigerant at a temperature between —50° C. and —150° C., adding thereto a Friedel Crafts type catalyst and then within a time interval of 5 minutes, adding to the mixture of diolefin, refrigerant and catalyst, a portion of chilled isoolefin, comprising isobutylene in the proportion of 70 parts to 90 parts, and conducting the polymerization of the mixed olefins to yield an interpolymer.

ROBERT M. THOMAS.
DONALD C. FIELD.